March 2, 1937.  F. A. DONALDSON  2,072,548
AIR CLEANER
Filed Dec. 17, 1934  2 Sheets-Sheet 1
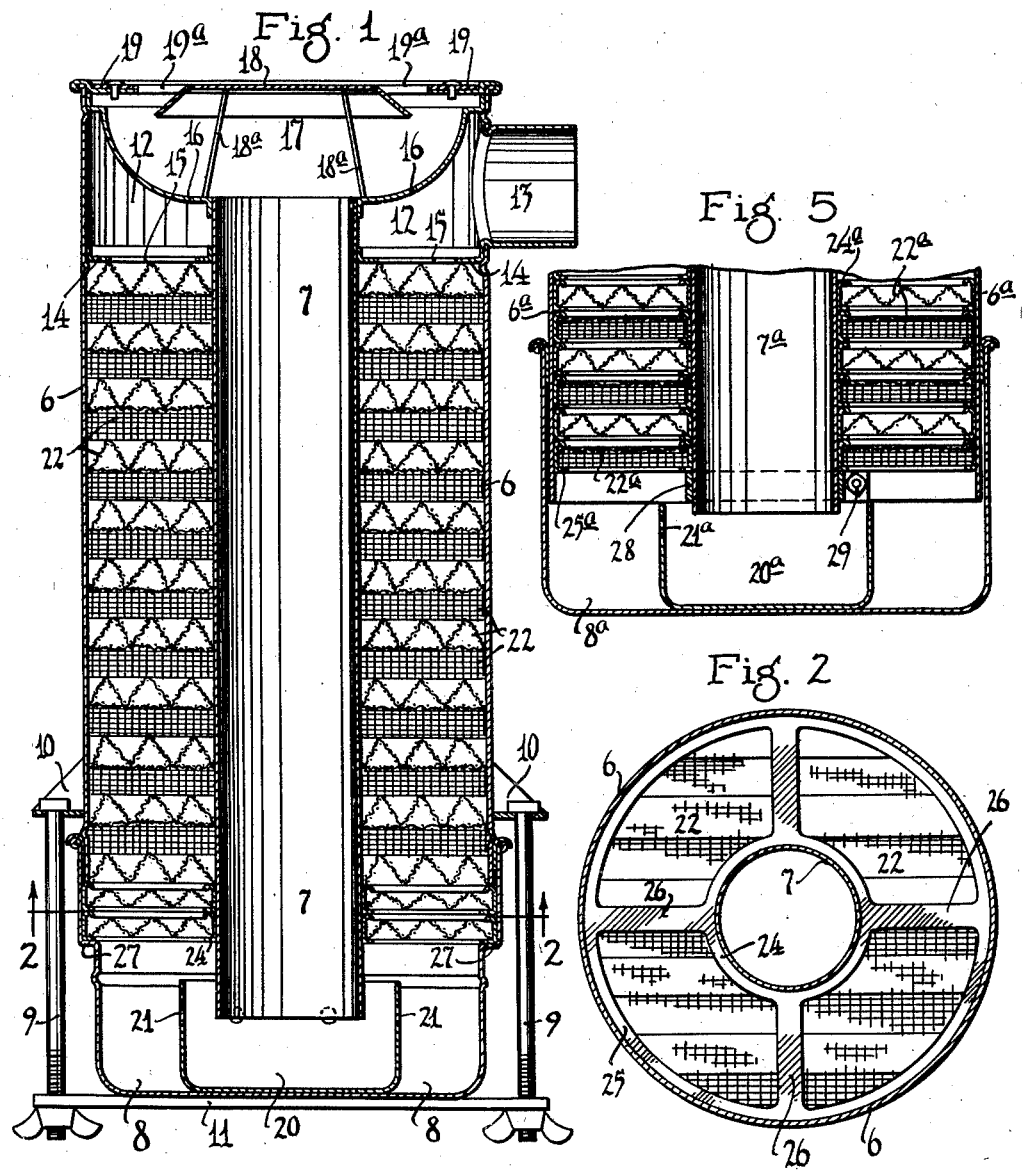
INVENTOR
Frank A. Donaldson
BY HIS ATTORNEYS March 2, 1937.　　　F. A. DONALDSON　　　2,072,548
AIR CLEANER
Filed Dec. 17, 1934　　　2 Sheets-Sheet 2

INVENTOR
Frank A. Donaldson
BY HIS ATTORNEYS

Patented Mar. 2, 1937

2,072,548

UNITED STATES PATENT OFFICE 2,072,548

AIR CLEANER

Frank A. Donaldson, Minneapolis, Minn.

Application December 17, 1934, Serial No. 757,827

4 Claims. (Cl. 183—15)

My present invention relates to air cleaners and is in the nature of an improvement on or modification of the air cleaners disclosed and claimed in the pending applications of Wilfred W. Lowther, S. N. 702,482, Patent 2,000,706, dated May 7, 1935, and S. N. 702,483, Patent 1,991,758 dated Feb. 2, 1935, filed of date December 15, 1933. The invention relates particularly to the form of screen elements and their relation to the body shell or casing and removable oil well, and to an arrangement whereby certain of the lower screen elements are made removable from the body shell with the well.

Under long continued use, the lowermost of the screen elements will sometimes require cleaning, and to make this an easy matter and one the necessity of which will be determined each time that the well is removed to clean out accumulated dirt and to refill the cleaner with oil, the arrangement is such that the lower screens or certain thereof will be removed with the well. Also the invention provides an improved form of screen element. These screen elements are preferably produced from a long screen ribbon which is first corrugated, and after it is corrugated, is cut into the form of annular discs, that is, discs having large axial or central holes therein. These screen elements are then assembled in the casing surrounding an axial air intake passage and overlying the oil well, and with the corrugations of the adjacent contacting discs arranged on transversely intersecting lines.

In the accompanying drawings, which illustrate the invention, like characters indicate like parts throughout the several views.

Referring to the drawings:

Fig. 1 is a vertical axial section taken through the complete air cleaner;

Fig. 2 is a horizontal section taken on the line 2—2 of Fig. 1;

Fig. 5 is a fragmentary axial section taken through the lower portion of an air cleaner very much like that shown in Fig. 1, but having a somewhat different arrangement of the screens.

Figure 3:
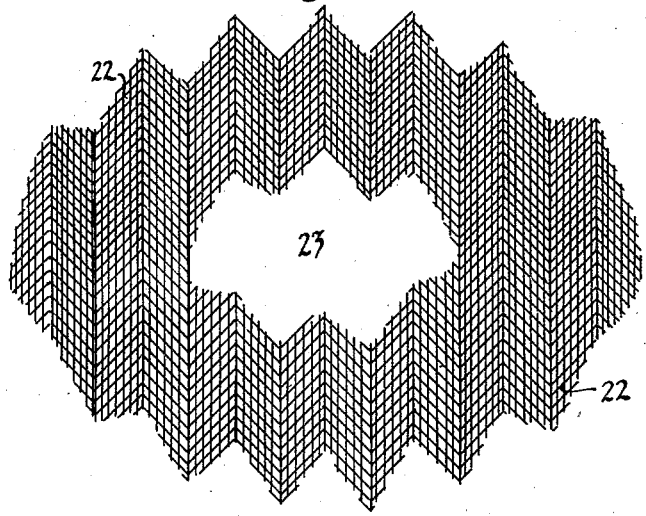
Fig. 3 is a perspective showing one of the screen elements.

The air cleaner shown involves an outer shell or casing that is preferably in the form of an upright cylinder 6, the lower end of which is primarily open. An axial air intake tube 7 extends downward through the casing 6. A large or main oil well 8 of cup-shaped form enclosed at its bottom end is telescoped onto the lower end of the casing 6 and closes the lower end of said casing. To securely but detachably hold the well telescoped onto the casing as stated, nut-equipped bolts 9 are passed through lugs 10 on the casing and through the ends of the bar 11 that is applied to the bottom of the oil well. At the upper end of the casing is an air chamber 12 that surrounds the air intake tube 7 and is provided with a lateral air outlet 13 adapted to be coupled to the carburetor of an internal combustion engine.

The bottom of the chamber 12 is formed by a disc-like baffle 14 that is formed with an annular air passage 15. The top of the air outlet chamber 12 is shown as formed by an outwardly flaring annular plate 16 that is connected to the upper end of the air intake tube 7 and to the top of the casing 6 and forms an air intake chamber 17 that is of much greater diameter than the air intake tube. The chamber 17 is covered by a disc-like baffle 18, which as shown is supported from the plate 16 by several small posts or rods 18a. An annular flange 19 is secured to the upper edge of the casing and is spaced from the baffle disc 18 to afford an annular air passage 19a. The baffle disc 18 is concentric to but of much greater diameter than the upper end of the air tube 7. Within and secured to the bottom of the oil well 8 is an oil cup 20 that is of much less diameter than said oil well, of considerably greater diameter than the lower end of the air intake tube 7 and the upper edge of which is considerably above the plane of the lower edge of said air tube. Approximately in the plane of the lower end of the air tube 7 the cup 20 is formed with circumferentially spaced oil passages 21, for a purpose which will hereinafter appear, but which is not herein claimed.

The screen-forming elements 22, as indicated, are formed of quite fine mesh woven wire formed with transverse or parallel corrugations. These screen elements are peripherally round or cut to form the interior of the cylindrical casing and they are formed with large central openings 23 that adapt them to be telescoped around the air intake tube. These corrugated screen elements are assembled in a stack within the casing, as best shown in Fig. 1, with the corrugations of the adjacent screen elements intersecting and preferably arranged approximately at right angles, although the relative angularity thereof can be varied at will.

Figure 4:
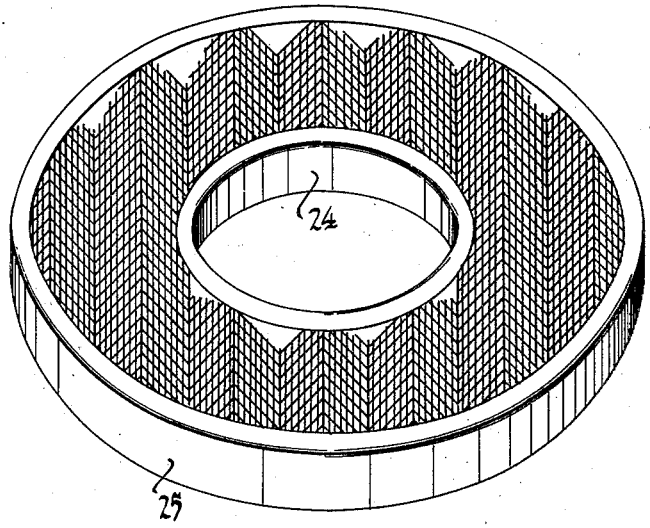
Fig. 4 is a perspective showing one of the screen elements placed within a containing frame.

As shown in Fig. 1, those screen elements that are within the casing may be assumed to be applied therein by any suitable means such as by solder or the like applied to the lowermost of said screens. However, several of the said screens are located below the lower edge of the shell and are contained within the oil well, and these lower screen elements are preferably arranged within thin sheet metal frames, as best shown in Figs. 1 and 2. These frames, it will be noted, see also Fig. 4, comprise annular hub flanges 24, annular rim flanges 25 and spokes or radial arms 26. The flanges 24 and 25 are also preferably clinched over the inner and outer edges of the inserted corrugated screen elements. As shown in Fig. 1, the two lowermost of the screen elements are thus placed in frames and these are placed within the oil well, the latter being preferably bulged outward at 27 to form an annular seat for the frames of said elements.

*Operation*

The operation, briefly stated, is as follows: The oil well and cup will be primarily filled approximately to the level of the top of the cup 20. When the engine is in action, partial vacuum will be produced in the air chamber 12 and this, of course, will draw air downward through the air intake tube 7 and through the oil in the cup. By the inrush of air, the oil will be displaced and carried upward through the annular space between the lower end of the air tube and the rim of the cup, and from thence will be carried upward through the various screen elements. The extent to which the air will carry the oil upward through the screen elements will, of course, depend largely on the speed of the engine and the velocity of the air. Before the oil reaches the uppermost screen elements, however, it will be released from the air current and will flow back over and through the screens. In running down onto the screens, the oil will form films over the openings in the screens through which the air must pass, so that all of the dust carried by the air will be taken from the air and returned with the oil downward and back to the oil well. By alternating or setting the adjacent screens on intersecting lines, the efficiency of the air cleaning action will be increased due to the varying ways in which the air current will be split up and the oil will be intercepted.

The upward air current will be strongest close to the exterior of the air tube and hence the oil will be carried up chiefly in that zone and there will be a tendency of the oil to run back chiefly outwardly and more nearly adjacent to the interior of the casing, so that when the engine is in action, there will be a more or less banking up of oil adjacent the lower portion of the casing and backward flow from that point to the oil well outward of the cup. However, the oil returning to the well will flow backward into the cup through the oil passages 21, so that oil will always be contained within the cup for direct contact with the dust-laden air carried downward into the cup from the air tube. Of course, while the engine is in action, there will be a very considerable amount of oil held in flowing suspension on screens. If at any time there should be an over-accumulation of oil in the cup, there may be a limited outward flow of oil from the cup into the well, and some of the air may then even be carried outward into the passages 21 and from thence upward against the screens. Of course, the clean air will be drawn upward through all of the screens into the air chamber 12 and hence through the outlet 13 to the carburetor.

As already indicated, whenever the oil well is removed for the purpose of changing or replenishing the oil, the several lower screens which, as shown, are within the frames, will be removed with the well so that the cleaning thereof, if required, will not be overlooked. In fact, these lower screens will naturally be removed from the well to facilitate the operation of the removal of the dirty oil and application of new clean oil.

It is important to note that the entire surfaces of the screens are bent to form contiguous, parallel alternated, V-shaped corrugations, and that these screens are stacked together with the contacting ridges of the corrugations of adjacent screens in transversely intersecting relation, that is stated the oblique portion of the one corrugation runs into the oblique portion of an adjacent corrugation and that contiguous or immediately adjacent parallel V-shaped channels are formed both below and above the screen.

In case of a back explosion from the engine, which sometimes will cause a surge of oil upward through the air intake tube 7, the oil thus thrown into the chamber 16 will be dashed against the deflecting plate or diaphragm 18 and by the down-turned flanges thereof will be deflected backward to the bottom of said chamber 16 and thence caused to flow back to the oil well through the air intake tube. The dust-laden air drawn into the cleaner will, of course, be drawn from the atmosphere through the annular passage 19a and from thence downward into and through the air tube.

In Fig. 5, there is illustrated a somewhat modified form of the cleaner, in which structure the parts corresponding to those illustrated in Fig. 1 are indicated by the same numerals with the exponent *a* added. Here it will noted that all of the screen elements are mounted within the frames 22a and these frames are telescoped into the casing and around the air intake tube 7a. These frame-equipped screens are all removable from the casing, but are normally held in place by suitable means such as a split collar 28 applied around the lower end of the air intake tube and provided with a nut-equipped clamping screw 29 for securely holding said collar and hence the screens in working position.

From the foregoing, it is evident that the apparatus described is capable of various modifications within the scope of my invention as herein disclosed and claimed.

What I claim is:

1. A screen element that is formed with parallel transverse corrugations and with a central passage adapting it to be placed within the casing and around the axial air intake tube, and a frame in which said screen element is mounted, said frame comprising inner and outer annular portions connected by radial spokes.

2. In an air cleaner, the combination with an upright casing having an air outlet at its upper portion, provided with a removable oil well at its bottom and provided with an axial air intake tube leading to said well, of screen elements applied around said air intake tube and applied to and removable with said oil well and completely spanning the space between said air tube and the surrounding wall of said removable oil well.

3. In an air cleaner, the combination with an upright casing having an air outlet at its upper portion, provided with a removable oil well at its bottom and provided with an axial air intake tube leading to said well, of a screen made up of a stack of woven screen elements placed in the space around said air intake tube, certain of the upper screen elements being applied within said casing above said oil well and certain of the lower screen elements being applied within and removable with said oil well and completely spanning the space between said air tube and the surrounding wall of said removable oil well.

4. In an air cleaner, the combination with an upright casing having an air outlet at its upper portion, provided with a removable oil well at its bottom and provided with an axial air intake tube leading to said well, of a screen made up of a stack of woven screen elements placed in the space around said air intake tube, certain of the upper screen elements being applied within said casing above said oil well and certain of the lower screen elements being applied within and removable with said oil well, said screen elements being located within said oil well and contained with metallic holders comprising inner and outer rims and connecting spokes.

FRANK A. DONALDSON.